US012292865B2

United States Patent
Kim

(10) Patent No.: US 12,292,865 B2
(45) Date of Patent: May 6, 2025

(54) METHOD AND SYSTEM FOR SELECTIVE TRANSFER OF ORGANIZATIONAL DATA IN CASE OF DIVESTITURE

(71) Applicant: ARMIQ Co., Ltd., Seoul (KR)

(72) Inventor: Oxoo Kim, Seoul (KR)

(73) Assignee: ARMIQ Co., Ltd., Seoul (KR)

( * ) Notice: Subject to any disclaimer, the term of this patent is extended or adjusted under 35 U.S.C. 154(b) by 150 days.

(21) Appl. No.: 17/474,897

(22) Filed: Sep. 14, 2021

(65) Prior Publication Data

US 2022/0092040 A1    Mar. 24, 2022

(30) Foreign Application Priority Data

Sep. 18, 2020   (KR) .................. 10-2020-0120335
Aug. 5, 2021    (KR) .................. 10-2021-0103166

(51) Int. Cl.
| | |
|---|---|
| G06F 16/20 | (2019.01) |
| G06F 16/21 | (2019.01) |
| G06F 16/215 | (2019.01) |
| G06F 16/22 | (2019.01) |
| G06F 16/25 | (2019.01) |
| G06F 16/84 | (2019.01) |
| G06F 8/61 | (2018.01) |

(52) U.S. Cl.
CPC .......... *G06F 16/214* (2019.01); *G06F 16/215* (2019.01); *G06F 16/2282* (2019.01); *G06F 16/254* (2019.01); *G06F 16/86* (2019.01); *G06F 8/63* (2013.01)

(58) Field of Classification Search
CPC .. G06F 16/214; G06F 16/215; G06F 16/2282; G06F 16/254; G06F 16/86; G06F 8/63
See application file for complete search history.

(56) References Cited

U.S. PATENT DOCUMENTS 11,741,380 B2 *  8/2023  Khawas ................ G06N 20/20
                                              706/12
2007/0124302 A1*  5/2007  Korn ..................... G06F 16/258
2009/0300057 A1* 12/2009  Friedman ............ G06F 11/3664
                                              707/999.102

(Continued)

FOREIGN PATENT DOCUMENTS

JP    2003288464 A    10/2003
JP    2015147349 A     8/2015
(Continued)

*Primary Examiner* — Diedra McQuitery
(74) *Attorney, Agent, or Firm* — Benesch Friedlander Coplan & Aronoff LLP

(57) ABSTRACT

A method and system for selective transfer of organizational data in case of a divestiture are disclosed. The method includes: exporting a system architecture for a first database of a first organization from a first database of the first organization including data intended for migration from the first organization to a second organization; creating a second database of the second organization, which is a target database to which the intended data is to be transferred, in a system of the second organization by importing the exported system architecture to the system of the second organization; extracting the intended data from the first database; and sending the extracted intended data to the second database of the second organization.

3 Claims, 16 Drawing Sheets

(56) References Cited

U.S. PATENT DOCUMENTS

| | | | |
|---|---|---|---|
| 2012/0124081 A1 | 5/2012 | Ebrahimi et al. | |
| 2012/0173483 A1* | 7/2012 | Hartig | G06F 9/4856 |
| | | | 707/610 |
| 2012/0215998 A1* | 8/2012 | Sharp | G06F 3/065 |
| | | | 711/E12.103 |
| 2013/0173546 A1* | 7/2013 | Cline | G06F 16/27 |
| | | | 707/638 |
| 2014/0201146 A1* | 7/2014 | Kapsiar | G06F 16/119 |
| | | | 707/635 |
| 2015/0081642 A1 | 3/2015 | Bardini et al. | |
| 2018/0081905 A1 | 3/2018 | Kamath et al. | |

FOREIGN PATENT DOCUMENTS

| KR | 1020170133866 | 12/2017 |
|---|---|---|
| KR | 1020190013425 | 11/2019 |

\* cited by examiner

METHOD AND SYSTEM FOR SELECTIVE TRANSFER OF ORGANIZATIONAL DATA IN CASE OF DIVESTITURE

CROSS-REFERENCE TO RELATED APPLICATION(S)

This U.S. non-provisional application claims the benefit of priority under 35 U.S.C. § 119 to Korean Patent Application No. 10-2020-0120335, filed Sep. 18, 2020, and Korean Patent Application No. 10-2021-0103166, filed Aug. 5, 2021, the entire contents of which are incorporated herein by reference in their entirety.

FIELD OF DISCLOSURE

The following description relates to a method and system for selective transfer of organizational data in case of a divestiture.

BACKGROUND OF THE DISCLOSURE

In recent years, mergers and acquisitions (M&A) of foreign and domestic companies are becoming more prevalent. M&A is now a big trend as a keyword for corporate management.

Enterprises can continually seek growth and development by exploiting external resources, and can get benefits such as saving time on entering into a new market, avoiding friction with existing market participants, increasing their market power, and introducing advanced technologies. Moreover, M&A activity is becoming increasingly common as a way of closing and selling existing marginal firms to adapt to changing environments and pursuing a takeover to bring a new business dynamic.

In this case, the buyer will demand the transfer of the seller's IT system and want to ensure the sustainable business continuity of an organization to be sold, and the seller will not want their organizational data they don't' sell to be transferred as a business asset. Due to this, there is a growing demand for a technology that can correctly select, separate, send, and convert large quantities of data in their system.

SUMMARY OF THE INVENTION

The present disclosure provides an organizational data transfer method and system which transfer data using a migration method.

The present disclosure provides an organizational data transfer method and system capable of migrating data by selecting either a cleansing method or a migration method as a method for separating and building a system according to requirements.

An exemplary embodiment of the present disclosure provides a method for migrating organizational data by a computer device comprising at least one processor, the method including: exporting, by the at least one processor, a system architecture for a first database of a first organization from the first database including data intended for migration from the first organization to a second organization; creating, by the at least one processor, a second database of the second organization, which is a target database to which the intended data is to be transferred, in a system of the second organization by importing the exported system architecture to the system of the second organization; extracting, by the at least one processor, the intended data from the first database; and sending, by the at least one processor, the extracted intended data to the second database of the second organization.

According to one aspect, the system architecture may include at least one of a table structure, computer program, and procedure used in a system of the first database.

According to another aspect, the extracting may include determining migration requirements of the intended data at at least one of a company code level, a business area level, and a plant level by using a structure of the first organization and a structure of the second organization to be separated from the first organization.

According to yet another aspect, the extracting may further include selecting data according to the migration requirements for the intended data by mapping objects corresponding to a particular company code of the company code level, a particular business area of the business area level, or a particular plant of the plant level.

According to a further aspect, the organizational data transfer method may further include selecting either a cleansing method or a migration method as a method for separating and building a system, based on at least one of the downtime of the intended data, a required level of data security, storage costs, and whether a system for the database of the first organization and a system for the database of the second organization are identical in terms of operating system and database management system.

According to a further aspect, the cleansing method may include a method in which a fourth database is created by cleansing data not intended for migration from the second database, and the created fourth database may be provided to the second organization.

According to a further aspect, the organizational data transfer method may further include deleting, by the at least one processor, data corresponding to the intended data extracted from the first database from the first database.

According to a further aspect, the organizational data transfer method may further include creating a third database by copying the first database, the exporting may further include exporting the system architecture for the first database from the third database, and the extracting may further include extracting the intended data from the third database.

Another exemplary embodiment of the present disclosure provides a computer-readable recording medium with a computer program recorded thereon to execute the above method in a computer device.

Another exemplary embodiment of the present disclosure provides a computer device comprising at least one processor implemented to execute a computer-readable instruction, wherein the at least one processor exports a system architecture for a first database of a first organization from the first database including data intended for migration from the first organization to a second organization, creates a second database of the second organization, which is a target database to which the intended data is to be transferred, in a system of the second organization by importing the exported system architecture to the system of the second organization, extracts the intended data from the first database, and sends the extracted intended data to the second database of the second organization.

Data may be transferred using a migration method.

Data may be transferred by selecting either a cleansing method or a migration method as a method for separating and building a system according to requirements.

DESCRIPTION OF EXEMPLARY EMBODIMENTS

Figure 1:
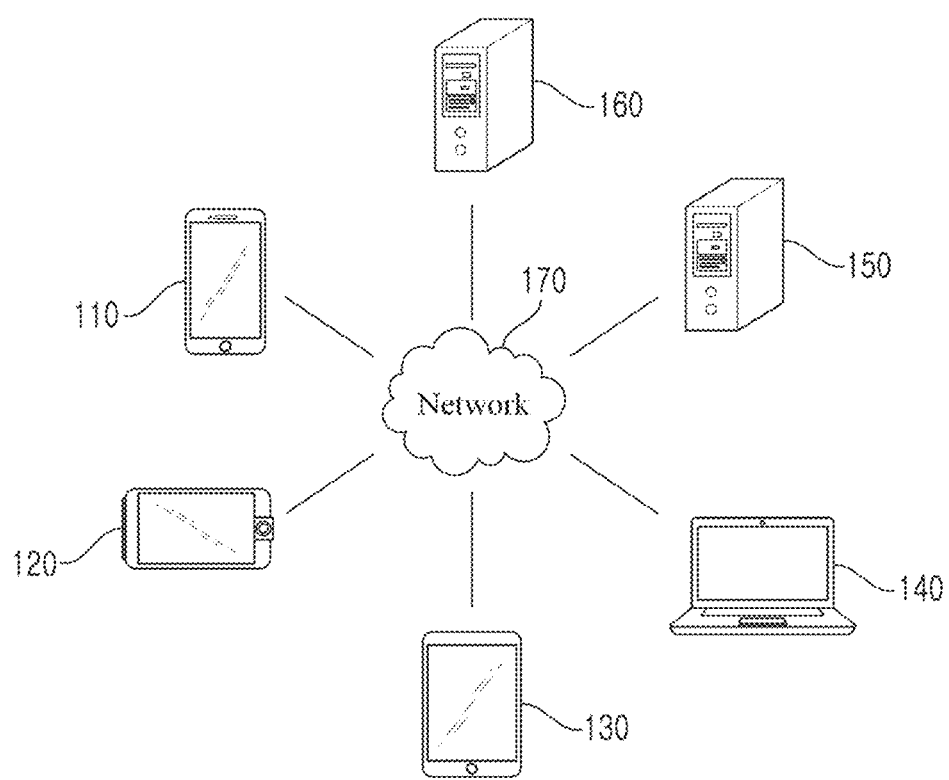
FIG. 1 is a diagram illustrating an example of a network environment according to an exemplary embodiment of the present disclosure.

The present disclosure may be variously changed and may have various embodiments, and thus specific embodiments will be illustrated in the drawings and will be described in detail. However, it should be understood that this is not intended to limit a specific embodiment and includes all changes, equivalents, and substitutions included in the spirit and the technical scope of the present disclosure. In describing each drawing, similar reference numerals are designated by similar components.

Although terms such as first, second, A and B may be used to describe various components, the components are not limited by the terms. The terms are used only to distinguish one component from other component(s). For example, a first component may be named a second component without departing from the scope of the right of the present disclosure. Similarly, the second component may be named the first component. Terms such as and/or include a combination of a plurality of related described items or any item of the plurality of related described items.

It should be understood that when it is mentioned that a first component is "connected to" is or "joined to" a second component, the first component is directly connected to or joined to the second component, but a third component may be interposed therebetween. On the other hand, it should be understood that when it is mentioned that a first component is "directly connected to" or is "directly joined to" a second component, a third component is not interposed therebetween.

Terms used herein are merely used to describe a specific embodiment, and are not intended to limit the present disclosure. A singular expression may include a plural expression unless otherwise specified. In the present application, it should be understood that the term such as "include" and "have" are intended to specify that there are features, numbers, steps, operations, elements, components, or a combination thereof disclosed in the specification, but do not preclude the presence or addition of one or more other features, numbers, steps, operations, elements, components, or combinations thereof.

Unless otherwise defined, all terms used herein including technical terms and scientific terms may have the same meanings as those generally understood by those skilled in the art to which the present disclosure pertains. The terms defined in a generally used dictionary should be interpreted to have the same meanings as those in the context of the related art, and are not interpreted as ideal or excessively formal meanings unless clearly defined in the present application.

Hereinafter, exemplary embodiments of the present disclosure will be described in detail with reference to the accompanying drawings.

An organizational data selection and separation system according to the exemplary embodiments of the present disclosure may be implemented by at least one computer device, and an organizational data selection and separation method according to the exemplary embodiments of the present disclosure may be performed through at least one computer device included in the organizational data selection and separation system. A computer program according to one embodiment of the present disclosure may be installed and run on the computer device, and the computer device may perform the organizational data selection and separation method according to the exemplary embodiments of the present disclosure under control of the running computer program. The aforementioned computer program may be coupled to the computer device and stored in a computer-readable recording medium to execute the organizational data selection and separation method on the computer device.

FIG. 1 is a diagram illustrating an example of a network environment according to an exemplary embodiment of the present disclosure. FIG. 1 shows an example in which the network environment includes a plurality of electronic devices 110, 120, 130, and 140, a plurality of servers 150 and 160, and a network 170. FIG. 1 is only an example for describing the present disclosure, and the number of electronic devices or the number of servers is not limited to what is shown in FIG. 1. Also, the network environment of FIG. 1 is only an example of environments applicable to embodiments of the present disclosure, and the environments applicable to embodiments of the present disclosure are not limited to the network environment of FIG. 1.

The plurality of electronic devices 110, 120, 130, 140 may be stationary terminals or mobile terminals that are implemented by a computer device. Examples of the plurality of electronic devices 110, 120, 130, 140 include a smart phone, a cellular phone, a navigation device, a computer, a laptop, a digital broadcasting terminal, a personal digital assistant (PDA), a portable multimedia player (PMP), a tablet PC, etc. Although FIG. 1 shows an image of a smartphone as an example of the electronic device 110, the electronic device 110 in the embodiments of the present disclosure may refer to one of various physical computer systems capable of substantially communicating with the other electronic devices 120, 130, and 140, and/or the servers 150 and 160 over the network 170, by using a wireless or wired communication method.

The method of communication is not particularly limited, and may include a communication method using near field communication between devices as well as a communication method using a communication network (e.g., a mobile communication network, wired Internet, wireless Internet, and a broadcasting network) which the network 170 may include. For example, the network 170 may include one or more networks, including a personal area network (PAN), a local area network (LAN), a campus area network (CAN), a metropolitan area network (MAN), a wide area network (WAN), a broadband network (BBN), and the Internet. Also, the network 170 may include, but not limited to, one or more network topologies, including a bus network, a star network, a ring network, a mesh network, a star-bus network, a tree or hierarchical network, and the like.

Each of the servers 150 and 160 may be configured as a computer device or a plurality of computer devices that provide instructions, code, files, content, services, and the like through communication with the plurality of electronic devices 110, 120, 130, and 140 over the network 170. For example, the server 150 may be a system that provides service (e.g., an archiving service, a file distribution service, a map service, a content provision service, a group call service (or a voice conference service), a messaging service, a mail service, a social network service, a translation service, a financial service, a payment service, and a search service).

Figure 2:
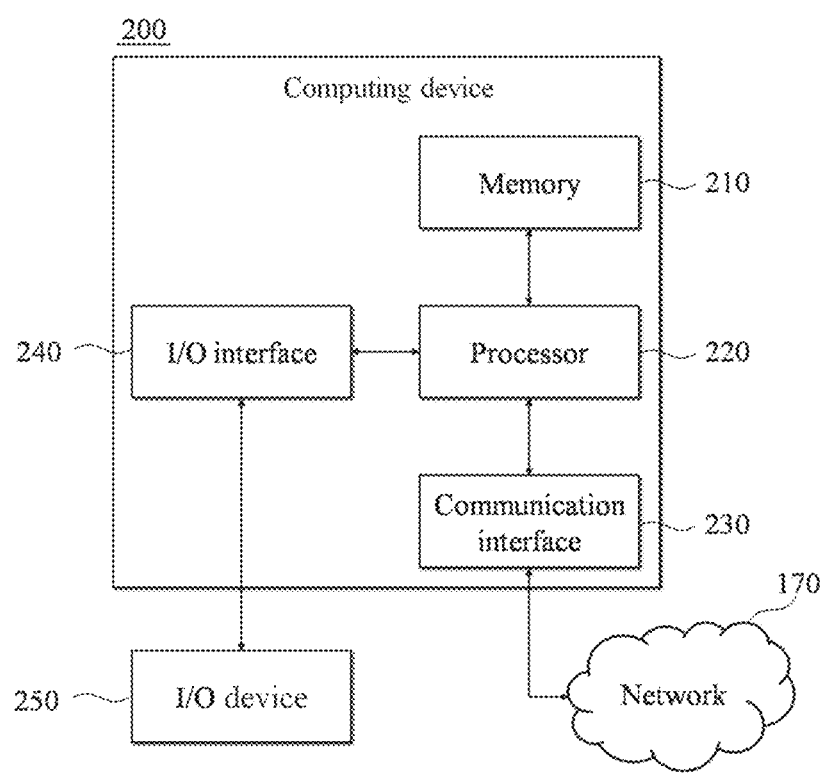
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include a permanent mass storage device, such as random access memory (RAM), read only memory (ROM), or a disk drive. In this case, the permanent mass storage device, such as ROM and a disk drive, may be included in the computer device 200 as a permanent storage device separate from the memory 210. Furthermore, an operating system and at least one program code may be stored in the memory 210. Such software elements may be loaded from a computer-readable recording medium, separate from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210, not through a computer-readable recording medium but through the communication interface 230. For example, the software elements may be loaded onto the memory 210 of the computer device 200 based on a computer program installed by files received over the network 170.

The processor 220 may be configured to process instructions of a computer program by performing basic arithmetic operations, logic operations, and I/O operations. The instructions may be provided to the processor 220 by the memory 210 or the communication interface 230. For example, the processor 220 may be configured to execute received instructions based on a program code stored in a storage device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a storage device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be saved in a storage medium (i.e., the aforementioned permanent storage device) which may be further included in the computer device 200.

The input/output interface 240 may be a means for interfacing with an input/output device 250. For example, the input device may include a device, such as a microphone, a keyboard, or a mouse, and the output device may include a device, such as a display or a speaker. For another example, the input/output interface 240 may be a means for interfacing with a device whose functions for input and output are integrated into one, such as a touchscreen. The input/output device 250, together with the computer device 200, may be configured as a single device.

Furthermore, in other embodiments, the computer device 200 may include fewer or more elements than those in FIG. 2. However, it is not necessary to clearly illustrate most of its conventional elements. For example, the computer device 200 may be implemented to include at least part of the input/output device 250 or may further include other elements, such as a transceiver and a database.

Figure 3:
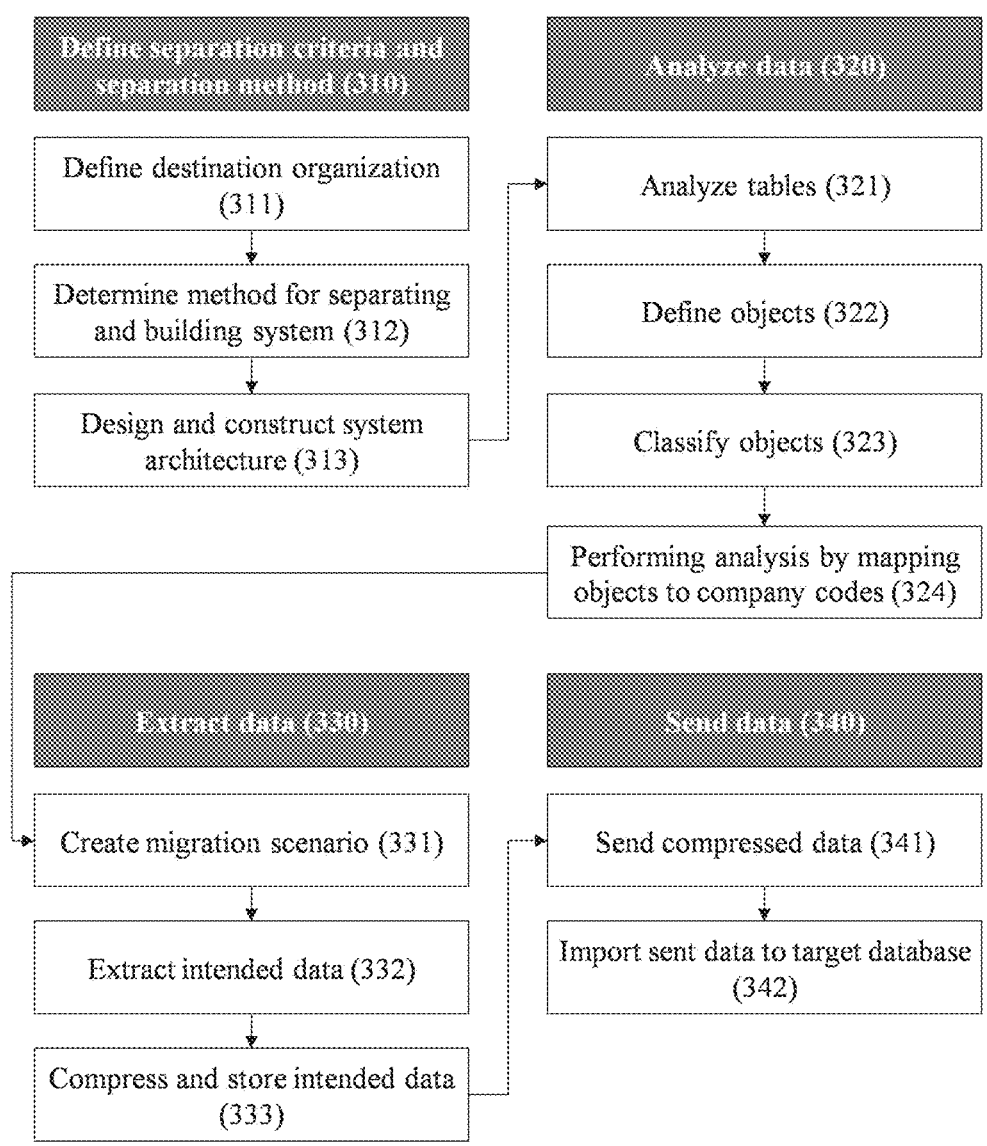
FIG. 3 is a diagram illustrating an example of an overall architecture and procedure of organizational separation in one embodiment of the present disclosure.

FIG. 3 is a diagram illustrating an example of an overall architecture and procedure of organizational separation in one embodiment of the present disclosure. The procedure of organizational separation according to the embodiment of FIG. 3 may be performed through the computer device 200 explained with reference to FIG. 2. Here, the computer device 200 may be a physical device of a relay system for migrating data intended for migration from a first organization to a second organization.

In the step 310, the computer device 200 may define separation criteria and a separation method. Here, the separation method may correspond to a method for separating and building a system which is to be described later. The step 310 may include the step 311 of defining a destination organization, the step 312 of determining the method for separating and building a system, and the step 313 of designing and constructing a system architecture.

In the step 311, the computer device 200 may define a destination organization. A method of defining a destination organization will be described in more detail with reference to FIGS. 4 and 5.

Figure 4:
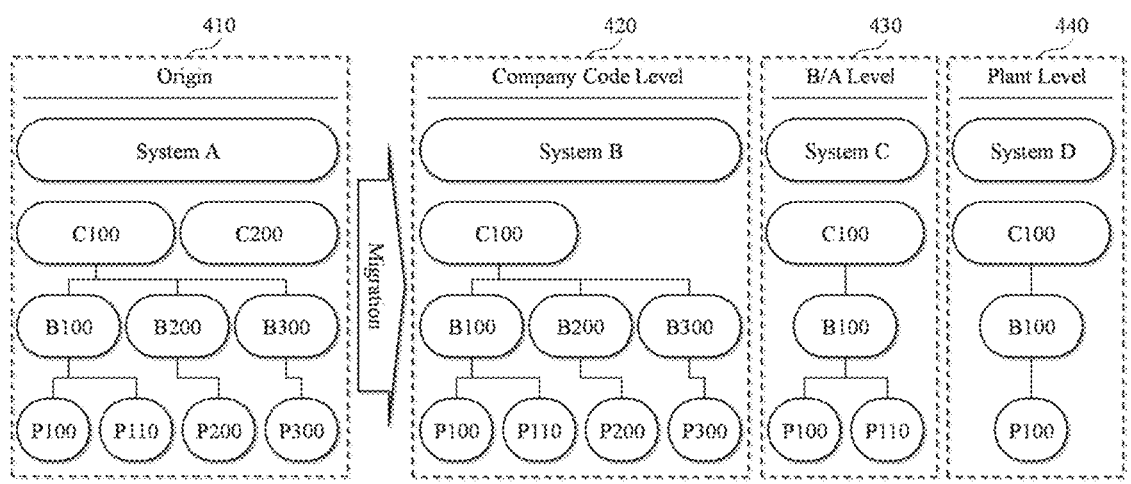
FIG. 4 illustrates an example of an organizational structure in one embodiment of the present invention.

For example, FIG. 4 illustrates an example of an organizational structure in one embodiment of the present invention. An Origin 410 shows an example of a structure of a first organization to be spun off or sold. It is assumed that the Origin 410 manages data of two companies C100 and C200 through System A. Also, it is assumed that the first company C100 includes three business areas B100, B200, and B300, and that the first business area B100 includes a first plant P100 and a second plant P110, the second business area B200 includes a third plant P200, and the third business area B300 includes a fourth plant P300.

In this case, a Company Code Level 420 shows an example in which the Origin 410 separates an organization by Company Code. More specifically, data on the first company C100 is to be transferred, and data on the second company C200 is to be deleted.

Moreover, a B/A Level 430 shows an example in which the Origin 410 separates an organization by Business Area B/A. More specifically, data on the first business area B100 is to be transferred, and data on the rest (the second company C200, the second business area B200, and the third business area B300) is to be deleted.

In addition, a Plant Level 400 shows an example in which the Origin 410 separates an organization by Plant. More specifically, data on the first plant P100 is to be transferred, and the data on the rest (the second company C200, the second business area B200, the third business area B300, and the second plant P110) is to be deleted.

The computer device 200 may define a destination organization by receiving information that classifies the destination organization by at least one of system, business area, and plant.

Figure 5:
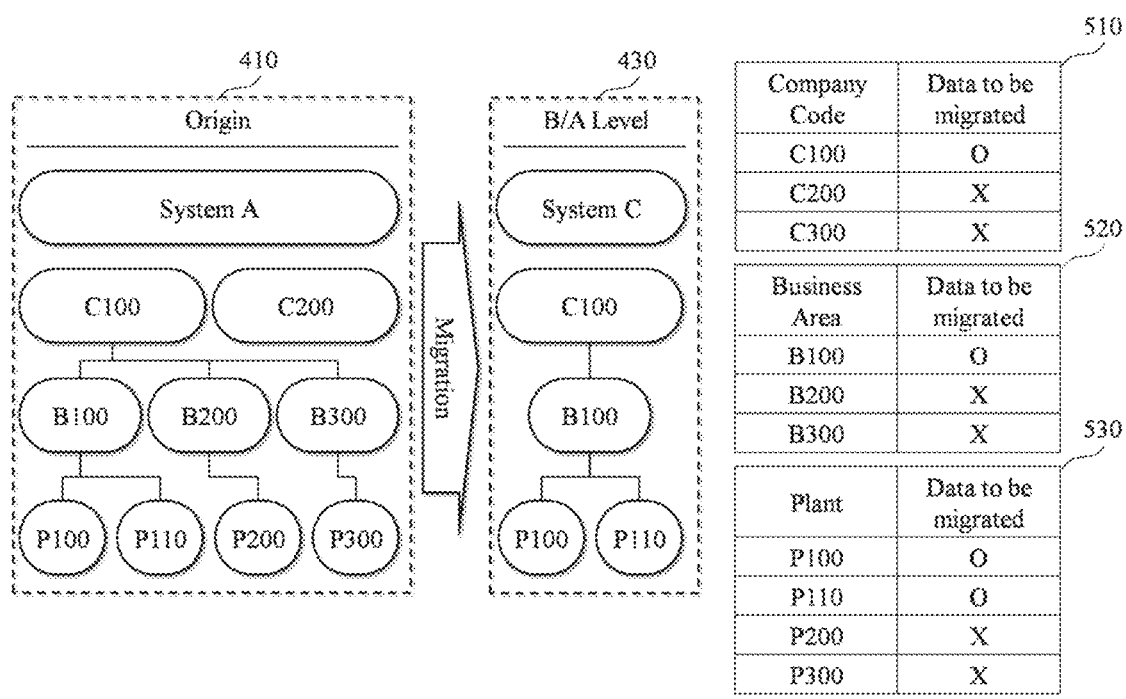
FIG. 5 shows an example of a definition of an organizational structure and an example of a definition of corresponding migration requirements, in one embodiment of the present disclosure.

FIG. 5 shows an example of a definition of an organizational structure and an example of a definition of corresponding migration requirements, in one embodiment of the present disclosure. Tables 510 to 530 of FIG. 5 show an example in which, when the Origin 410 of FIG. 4 is migrated to the B/A level 430 in accordance with the business area, the migration requirements are defined. In other words, the computer device 200 may define that the Company Code "C100" in the Company Code Level 420 of FIG. 4 is to be migrated and "C200" and "C300" are not to be migrated, as in the first table 510. Also, the computer device 200 may define that the business area "B100" in the B/A Level 430 is to be migrated and "B200" and "B300" are not to be migrated, as in the second table 520. Also, the computer device 200 may define that the plants "P100" and "P110" in the B/A Level 430 are to be migrated and "P200" and "P300" are not to be migrated, as in the third table 530.

Referring again to FIG. 3, in the step 312, the computer device 200 may determine the method for separating and building a system. As example of the method for physically separating and building a system, a cleansing method and a migration method may be used. For example, the cleansing method is a method in which all data of an organization to be sold is deleted except data that needs to be transferred to a buying organization, which may be used when the volume of data to be migrated is large and there is a need to minimize downtime. Here, the downtime may refer to periods when the system is unavailable because of the system separation and building. Meanwhile, the migration method is a method in which data that needs to be transferred to a buying organization is extracted from among data of an organization to be sold, which may be used when the volume of data to be migrated is small and data security is a primary concern. In other words, the computer device 200 may determine the cleansing method or the migration method as the method for physical separation of a system, by taking various factors into account, such as timing for separation of an organization, data assets to be sold, the system's location, etc. The cleansing method and the migration method will be described in more detail with reference to FIGS. 6 and 7.

In the step 313, the computer device 200 may design and construct a system architecture. Here, the system architecture may include a target system to which data is to be transferred and/or the target system's database. A process of designing and constructing the system architecture will be described in more detail with reference to FIGS. 6 and 7.

Figure 6:
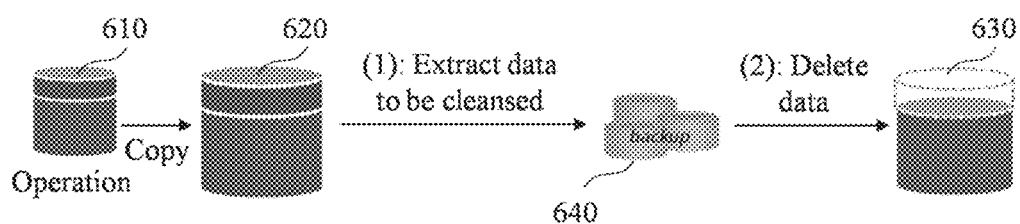
FIG. 6 is a diagram illustrating an example of the cleansing method in one embodiment of the present disclosure.

FIG. 6 is a diagram illustrating an example of the cleansing method in one embodiment of the present disclosure. As explained previously, the cleansing method and the migration method may be used to physically separate a system. The cleansing method may be performed by deleting all data except data of an organization to be sold. The cleansing method may be used when the volume of data to be migrated is relatively large and minimizing downtime is a primary concern. To this end, the computer device 200 may create a second database 620 by copying a first database 610 of a first organization including data intended for migration. In this case, the computer device 200 may receive deletion requirements as input, and select data by mapping the deletion requirements to business objects of the second database 620. Also, the computer device 200 may extract the selected data from the second database 620, and may delete data matching the extracted data from a table in the second database 620 to create a third database 630 for transfer. The extracted data may be saved as a file 640.

In this cleansing method, a system architecture of the first database 610 of the first organization is a copy of the first database 610 of the first organization obtained by the second database 620, and may be automatically transferred to a second organization and constructed since data not to be transferred is deleted from the second database 620 to create the third database 630.

Figure 7A:
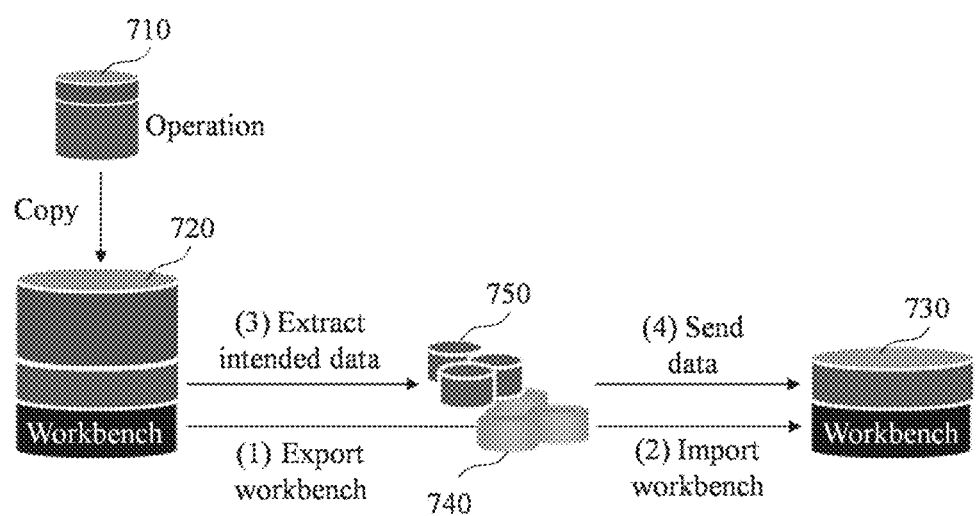
FIG. 7A is a diagram illustrating an example of the migration method in one embodiment of the present disclosure.

FIG. 7A is a diagram illustrating an example of the migration method in one embodiment of the present disclosure. The migration method may be performed by migrating data of an organization to be sold. In this case, the migration method may be used when the volume of data to be migrated is relatively large and/or data security is a primary concern. To this end, the computer device 200 may create a second database 720 by copying a first database 710 of a first organization including data intended for migration from the first organization to a second organization. In this case, the computer device 200 may export a system architecture for the second database 720 from the second database 720, in order to construct the system architecture. Here, the system architecture may include at least one of a table structure, computer program, and procedure used in the system of the second database 720. In a target system (the second organization's system) for receiving data intended for migration, the third database 730 may be prepared with no data so as to receive the intended data. In this instance, a basic database environment is required for running the target system, and the computer device 200 is therefore able to import the exported system architecture to the third database 730. For another example, the computer device 200 may create the third database 730 by deleting all data from the copied second database 720, and then transfer the third database 730 to the second organization to construct the system architecture.

Afterwards, the computer device 200 may extract the intended data from the second database 720 and send the extracted intended data to the third database 730 of the second organization to perform migration. In this instance, the intended data extracted from the second database 720 may be saved in a separate file 740 or a table 750 of a database and then sent to the third database 730.

Figure 7B:
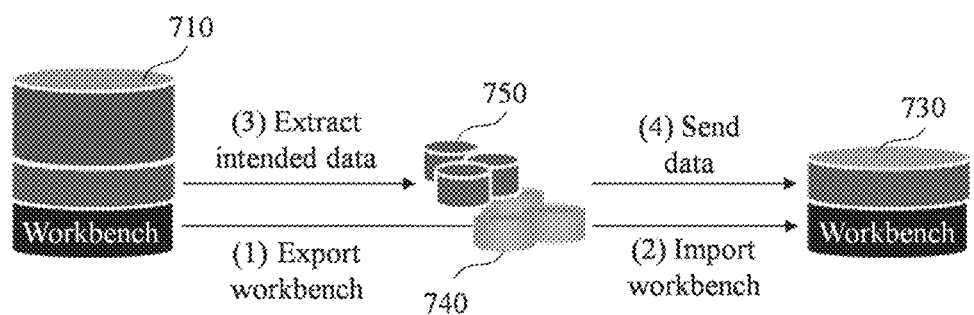
FIG. 7B is a diagram illustrating another example of the migration method in one embodiment of the present disclosure.

FIG. 7B is a diagram illustrating another example of the migration method in one embodiment of the present disclosure. According to the embodiment, in the migration method, the first organization's database is not copied but instead data intended for migration may be directly transferred from the first organization's database to the target system (the second organization's system)'s database. The embodiment of FIG. 7B describes a process of migrating data without copying it from the first organization's database.

The computer device 200 may directly transfer data intended for migration to the third database 730 of the second organization from the first database 710 of the first organization including the data intended for migration from the first organization to the second organization. First of all, the computer device 200 may export a system architecture for the first database 710 from the first database 710, in order to construct the system architecture. Here, the system architecture may include at least one of a table structure, computer program, and procedure used in the system of the second database 720. In a target system (the second organization's system) for receiving data intended for migration, the third database 730 may be prepared with no data so as to receive the intended data. In this instance, a basic database environment is required for running the target system, and the computer device 200 is therefore able to import the exported system architecture to the third database 730.

Afterwards, the computer device 200 may extract the intended data from the first database 710 and send the extracted intended data to the third database 730 of the second organization to perform migration. In this instance, the intended data extracted from the first database 710 may be saved in a separate file 740 or a table 750 of a database and then sent to the third database 730.

The cleansing may be performed online because data is directly transferred after deletion, and the migration may be performed offline.

In one embodiment, a source system including the first database 610 and 710 of the first organization may be located in an on-premise environment, and a target system which will include the third database 630 and 730 of the second organization may be located in a cloud environment. In another embodiment, both the source system and the target system may be located in an on-premise environment. In yet another embodiment, both the source system and the target system may be located in a cloud environment.

As for the migration method, heterogeneous migration methods may be available even if the source system and the target system have different operating systems and database management systems (DBMSs), and may be performed regardless of the target system's environment. However, the downtime during the migration may be considered depending on the location and environment of the target system.

Referring again to FIG. 3, in the step 320, the computer device 200 may analyze data. Here, the data may include data of a copied database (e.g., the second database 620 and 720). In the step 320, the computer device 200 may construct data in modules such as those of selection, combination, exclusion, etc. according to the intended use by grouping data based on a dependency between tables and then classifying each data depending on their type and property.

The step 320 may include the step 321 of analyzing tables, the step 322 of defining objects, the step 323 of classifying the objects, and the step 324 of performing analysis by mapping the objects to company codes.

In the step 321, the computer device 200 may analyze tables. The computer device 200 may analyze tables of a copied database to group and classify data. In this case, the computer device 200 may analyze table volume, number of tables, table fields, field data distribution, percentage of missing data, and where the fields are used in each domain (WUL. where-used-list). Also, the computer device 200 may analyze a dependency between tables, a distinction between a header and an item in a dependency relationship, and the presence or absence of organizations, times, creators, and property fields in each table. In addition, the computer device 200 may analyze the table's (1) application area (=module), (2) type such as master, transaction, configuration, system, etc., and (3) property such as invoice, count, history, log, etc.

In the step 322, the computer device 200 may define objects. For example, the computer device 200 may define tables (table group) grouped based on a dependency between the tables as an object. The object is the smallest unit of processing, which may be made up of one or more tables. For example, the smallest unit of processing may include, but not limited to, material master, customer master, price conditions, customer credit, sales orders, invoices, financial statements, account balances, profit analysis, interface logs, and user login history. For example, the smallest unit of processing may vary depending on the characteristics of the organization. Objects will be described in more detail with reference to FIGS. 8 and 9.

Figure 8:
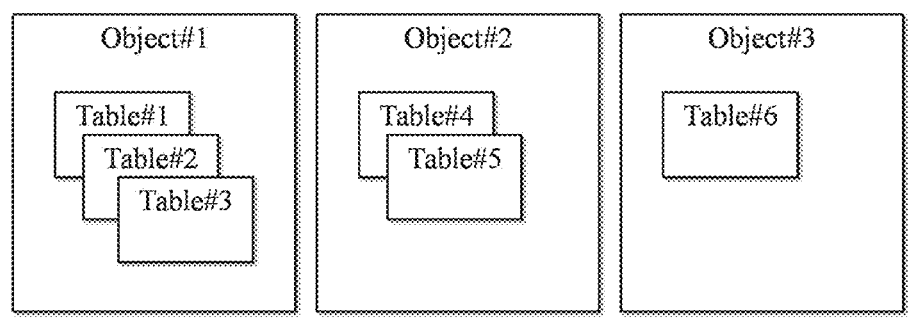
FIG. 8 is a diagram illustrating an example of business objects in one embodiment of the present disclosure.

FIG. 8 is a diagram illustrating an example of business objects in one embodiment of the present disclosure. FIG. 8 shows Business Object 1 (Object #1) including Table 1 (Table #1), Table 2 (Table #2), and Table 3 (Table #3), Business Object 2 (Object #2) including Table 4 (Table #4) and Table 5 (Table #5), and Business Object 3 (Object #3) including Table 6 (Table #6). Here, it can be seen that Table 1 (Table #1), Table 2 (Table #2), and Table 3 (Table #3) have dependency, and that Table 4 (Table #4) and Table 5 (Table #5) have dependency. Such business objects may be acquired as data included in a database is grouped in smallest units of processing based on a dependency between tables within the database. For example, the computer device 200 may group tables having dependency within a database (e.g., second database 620 and 720) into one object, and a plurality of objects may be defined depending on the database. The dependency between tables may mean that two tables each contain data identified by the same key value. In this instance, the data identified by the same key value in the tables having dependency may include at least one different field.

Figure 9:
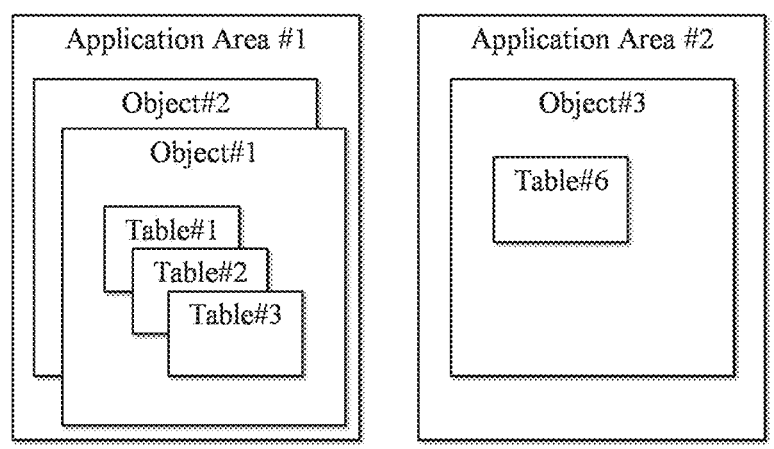
FIG. 9 is a diagram illustrating an example in which business objects are classified by application area in one embodiment of the present disclosure.

FIG. 9 is a diagram illustrating an example in which business objects are classified by application area in one embodiment of the present disclosure. FIG. 9 shows an example in which Business Object 1 (Object #1) and Business Object 2 (Object #2) are classified as Application Area 1 (Application Area #1) and Business Object 3 (Object #3) is classified as Application Area 2 (Application Area #2). Application areas may be defined variously depending on settings in the company that maintains and manages the database—for example, as production, sales, materials, financial accounting, management accounting, infrastructure, communication, industry, etc.

Referring again to FIG. 3, in the step 323, the computer device 200 may classify objects. In this instance, the computer device 200 may classify objects by module, type, and/or property.

As explained previously, a module may correspond to an application area. The computer device 200 may group objects by module to suit each process, in order to classify the objects by module. For example, the computer device 200 may classify objects according to production, sales, materials, financial accounting, management accounting, infrastructure, communication, industry, etc.

The type of an object may refer to master data, transaction data, configuration data, control data, system data, etc. For example, if the data in the object is used as a reference for generating data, the computer device 200 may classify this data as master data, and, if the data in the object is recurring data such as a time, organization, etc., the computer device 200 may classify this data as transaction data.

The property of the object may be classified as Document which refers to a recurring invoice or order, Status which describes the current production status of a product, History which save changes to a document, and Summary which describes the total value of a customer's transactions for a given period of time.

In the step 324, the computer device 200 may perform analysis by mapping objects to company codes. In this instance, the computer device 200 may simulate compatibility through an analysis of the percentage of missing data for a destination organization defined in the step 311 and an object defined in the step 322, and this allows for selecting fields to migrate from a reference table within the object.

More specifically, the computer device 200 may select a field used as a migration criterion. The field may be selected by using data values, the percentage of missing data, etc. The following Table 1 shows an example of selecting the most suitable field through an analysis of the percentage of missing data.

TABLE 1

| Table Name | Name of Field to Analyze | Field Value | Number of Data Records | Number of Missing Values | Percentage of Missing Data | Priority Level |
|---|---|---|---|---|---|---|
| AUFK | BUKRS | BUKRS | 5,856,643 | 499,427 | 8.5275% | 2 |
| AUFK | GSBER | GSBER | 5,856,643 | 499,377 | 8.5267% | 1 |
| AUFK | WERKS | WERKS | 5,856,643 | 1,506,891 | 25.7296% | 3 |
| AUFK | KOSTV | KOSTL | 5,856,643 | 3,082,949 | 52.6402% | 4 |
| AUFK | KOSTL | KOSTL | 5,856,643 | 5,365,742 | 91.6180% | 5 |
| AUFK | PRCTR | PRCTR | 5,856,643 | 5,830,968 | 99.5616% | 6 |

Moreover, the following Table 2 shows an example of counting the number of data records to migrate by analyzing the number of data records for each organization code within the field.

TABLE 2

| Table Name | Name of Field to Analyze | Field Value | Number of Data Records to Transfer | Percentage of Data Records to Transfer | Transfer |
|---|---|---|---|---|---|
| AUFK | GSBER | | 5,357,266 | | NO |
| AUFK | GSBER | B100 | 2,230,670 | 41.6% | YES |
| AUFK | GSBER | B200 | 1,126,749 | 21.0% | NO |
| AUFK | GSBER | B300 | 621,907 | 11.6% | NO |
| AUFK | GSBER | B400 | 470,032 | 8.8% | NO |
| AUFK | GSBER | ... | ... | ... | ... |

The second table 520 of FIG. 5 in the foregoing shows an example in which the second of the data columns in Table 2 are determined to be transferred since the business area "B100" is to be transferred.

In the step 330, the computer device 200 may extract data. The embodiment of FIG. 3 describes an example in which data is transferred by using the migration method. In this case, the step 330 may include the step 331 of creating a migration scenario, the step 332 of extracting data intended for migration, and the step 333 of compressing and storing the intended data.

In the step 331, the computer device 200 may create a migration scenario.

Figure 10:
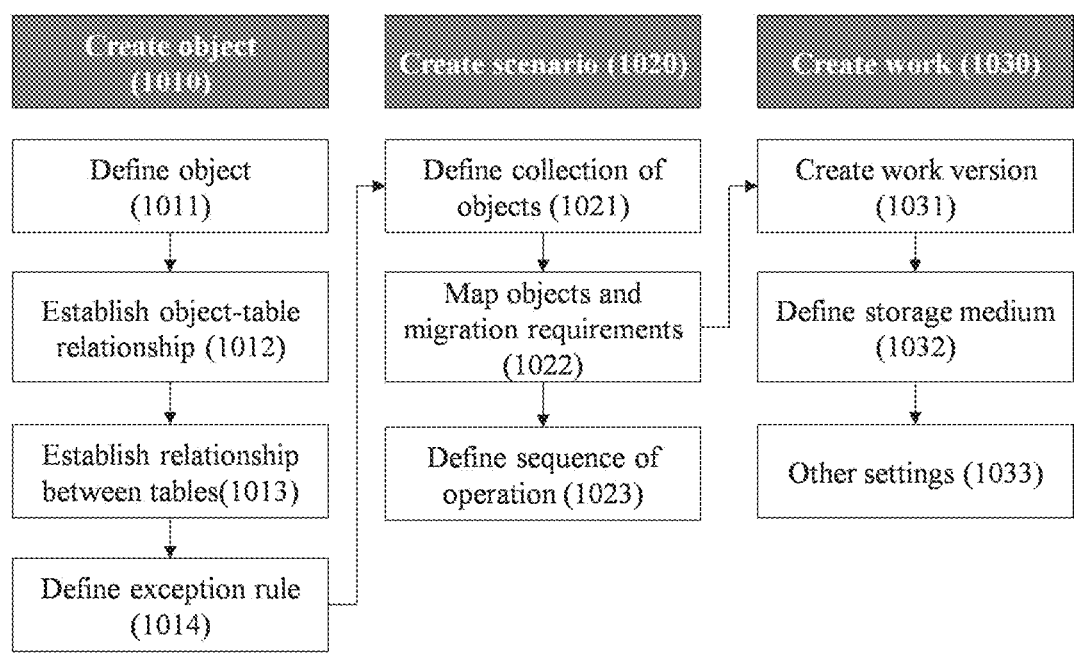
FIG. 10 is a diagram illustrating an example of a process for creating a migration scenario in one embodiment of the present disclosure.

FIG. 10 is a diagram illustrating an example of a process for creating a migration scenario in one embodiment of the present disclosure.

In the step 1010, the computer device 200 may create an object. For example, the computer device 200 may establish a relationship between an object and a table within the object. In this instance, if one object is composed of a number of tables, the computer device 200 may create the object in such a way as to include a header table which may be used as a reference and an item table subordinate to the header table. Also, if one object is composed of one table, the computer device 200 may create the object independently regardless of a relationship between tables. The step 1010 may include the step 1011 of defining an object, the step 1012 of establishing a relationship between the object and a table, the step 1013 of establishing a relationship between objects, and the step 1014 of defining an exception rule.

In the step 1011, the computer device 200 may define an object name and a description of the object.

In the step 1012, the computer device 200 may establish a relationship between the object and a table. For example, if the object is composed of a number of tables, the computer device 200 may represent a relationship between each table in a structured query language (SQL) conditional expression.

In the step 1013, the computer device 200 may establish a relationship between objects. If individual objects are combined by a single condition, the computer device 200 may divide them into header objects and item objects and represent a relationship between them. Such a relationship between objects may be used after object data is extracted from one object, when a subordinate object of the object needs to be extracted using the extracted object data.

In the step 1014, the computer device 200 may define an exception rule. When data needs to be added and/or excluded for each table within an object, the computer device 200 may add and/or exclude data by applying such an exception rule.

In the step 1020, the computer device 200 may create a scenario. The step 1020 may include the step 1021 of defining a collection of objects, the step 1022 of mapping objects and migration requirements, and the step 1023 of defining a sequence of operation.

In the step 1021, the computer device 200 may define a collection of objects. The scenario may be defined as a collection of objects to be migrated. For example, for all objects, the computer device 200 may configure a collection of objects as a scenario, and may define a scenario for each individual business property such as financial or sales data. Such a scenario may recur and function as a unit of migration operation later.

In the step 1022, the computer device 200 may map objects and migration requirements. For example, the computer device 200 may map migration requirements for each object. In this case, a company code may be generally used as a criterion. In some embodiments, a period may be used as a criterion, a combination of the company code and the period may be used as a criterion, or other criteria required by the user may be defined. The criteria required by the user may be entered individually into the computer device 200.

The following Table 3 is an example in which migration requirements are mapped to business objects, which show an example of migration criteria for separate units of company code.

TABLE 3

| Application Area | Business Object | Reference Table | Migration Criterion (Organization) | Organization Code |
|---|---|---|---|---|
| Financial | Customer Master | TAB_A | Company code, Business Area | C100 and B100 |
| Material | Material Master | TAB_B | Plant | P100 or P110 |
| Financial | Financial Accounting Invoices | TAB_C | Business Area | B100 |
| Material | Material Inventory Records | TAB_D | Plant | P100 or P110 |

For example, in a case where a particular company code is designated to be transferred, all of the business objects "Customer Master", "Material Master", "Financial Accounting Invoices", and "Material Inventory Records" associated with this company code may be used as a migration criterion, since Business Area and Plant are subordinate to the company because of the nature of the company's structure. Meanwhile, in a case where a particular plant is designated to be transferred, the business objects "Material Master" and "Material Accounting Invoices" associated with this plant may be transferred. For a more concrete example, in a case where the company is separated at the Plant Level 440 of FIG. 4, "Material Master" and "Material Inventory Records" identified by the first plant P100 may be data intended for migration.

Exceptional example 1 of other requirements than company code: Migration may be done with another criterion, i.e., a period, combined with the company code. For example, in a case where the company to be separated has been transformed from a division to a corporation at a particular point in time, the migration may be done based on the business area before the particular point in time, and the migration may be done based on the company code afterwards.

Exceptional example 2 of other requirements than company code: For example, if there is no company code or many changes such as retirements, transfers, dispatches, etc. are made to the company (e.g., personnel data), 'employee number' may be defined as a migration requirement, apart from a criterion for the company code.

Exceptional example 3 of other requirements than company code: If data has no criterion for the company code, as in a document, drawing, and email, a data creator may be used as a criterion. For example, if the company the creator belongs to is to be transferred, the corresponding data also may be separated and transferred.

In the step 1023, the computer device 200 may define a sequence of operation. For example, the computer device 200 may define a sequence of data to be extracted for each object. Generally, the computer device 200 may reduce the overall operation time by handling objects with a larger size or a larger number of data records first and then objects with a smaller size or a smaller number of data records later.

Referring again to FIG. 3, in the step 332, the computer device 200 may extract data intended for migration. The reason why the data intended for migration is extracted from a database (e.g., second database 720) is to correctly select and extract the intended data and consistently extract other related data using the extracted data. If an error occurs during a transfer due to a transmission failure or the like, the data may be re-transferred without being extracted over again.

In the step 333, the computer device 200 may compress and save the intended data. In this instance, the computer device 200 may compress the extracted data using a lossless compression algorithm such as ZIP, CTW, LZ77, LWZ, gzip, bzip2, and DEFLATE and save it in a table or as a file.

For example, the computer device 20 may extract data using a table storage medium. The computer device 200 may select and extract a parent table consisting of a number of tables within a business object according to migration requirements and then save it in a storage table. Also, the computer device 200 may select data that matches data in a child table by using the data in the storage table and save the selected data in the storage table. In this case, the computer device 200 may read the data in the storage table, select data in the parent table that matches data in the child table, and then save it in the storage table.

For another example, the computer device 200 may extract data using a file storage medium. A parent table consisting of a number of tables within a business object may be selected and extracted according to migration requirements and then saved in a file. Also, the computer device 200 may read the data of the file, select data in the parent table that matches data in a child table, and then save it in a file.

Figure 11:
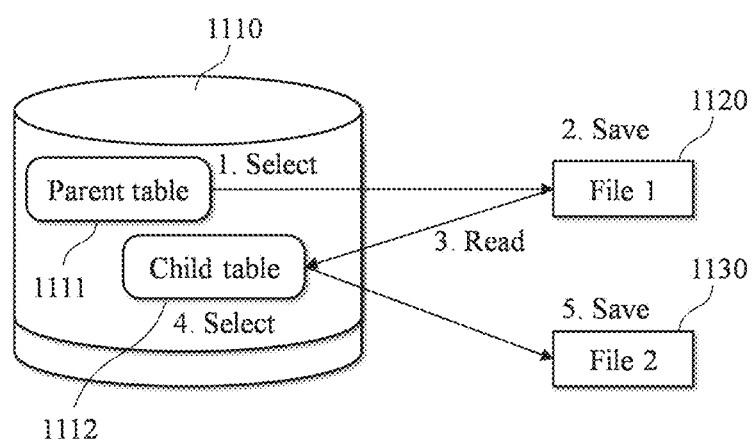
FIG. 11 is a diagram illustrating an example of extracting data intended for migration in one embodiment of the present disclosure.

FIG. 11 is a diagram illustrating an example of extracting data intended for migration in one embodiment of the present disclosure. The computer device 200 may select (1) and extract data from a parent table 1111 of a database 1110 and then save (2) it in File 1 1120. Afterwards, the computer device 200 may read (3) the data saved in File 1 1120, select (4) and extract other related data (data stored in a child table 1112 of the parent table 1111) linked to that data from the database 1110, and then save (5) it in File 2 1130. Accordingly, the computer device 200 is able to extract data from the second database 1110 while maintaining consistency between tables and utilize the data saved in File 1 1120 and File 2 1130 as backup data to recover the database 1110 in case of a migration is done according to a wrong migration requirement later.

Although the embodiment of FIG. 11 describes an example of saving extracted data in a file, the extracted data may be stored in the same database 1110 or in a table of another separate database as explained previously.

As such, the computer device 200 may save extracted data in a table within the same or another separate database or save it as a file in a local or remote system. In this instance, when saving data in a database or file, the computer device 200 may compress and store extracted data by using a lossless compression algorithm as explained previously. When compressing and saving data, part of the compressed data may be written to a separate index table and used.

Referring again to FIG. 3, in the step 340, the computer device 200 may send data. Here, the step 340 may include the step 341 of sending compressed data and the step 342 of importing the sent data to a target database.

In the step 341, the computer device 200 may send compressed data. Here, the compressed data may refer to the data that is compressed and stored in the step 333.

In the step 342, the computer device 200 may import the sent data to a target database. Data extracted from a database (e.g., the second database 720) may be compressed and stored in a table or file and then sent to a target database of a target system by means of the computer device 200. If the compression and storage medium is a file, the computer device 200 may send the file as it is or may read and decompress the file and send the data. If the compression and storage medium is a table in a database, the computer device 200 may send the data in the form of a compressed block or after decompressing the compressed block.

Figure 12:
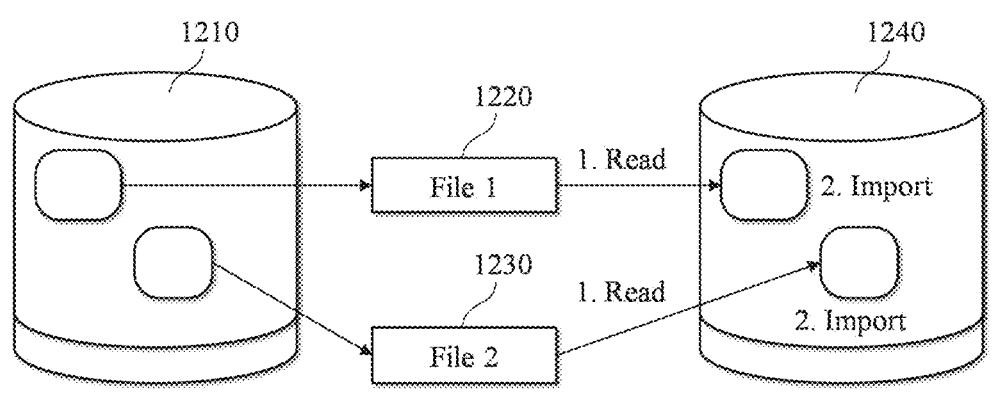
FIGS. 12 and 13 are diagrams illustrating an example of sending data in one embodiment of the present disclosure.
Figure 13:
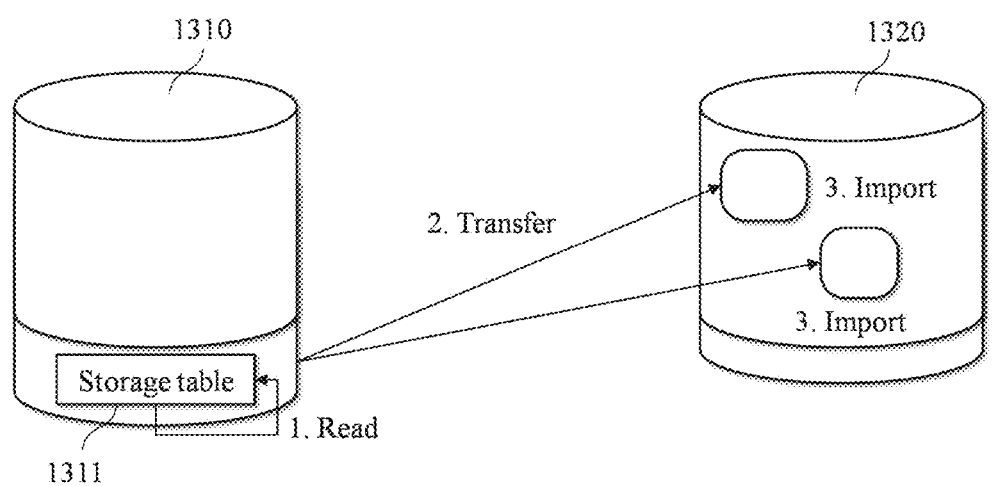

FIGS. 12 and 13 are diagrams illustrating an example of sending data in one embodiment of the present disclosure.

FIG. 12 shows an example in which data intended for migration extracted from a database 1210 is saved in files 1220 and 1230, and FIG. 13 shows an example in which data intended for migration extracted from a database 1310 is saved in a storage table 1311 of the database 1310.

The computer device 200 read the extracted and saved data from the files 1220 and 1230 or the storage table 1311 and send it to a target database, and then save the sent data in the target database. For example, the computer device 200 may decompress compressed data after the transmission and import it to the target database.

In some embodiments, the computer device 200 may send and import data in parallel in order to quickly transfer the data. Since compressed data is kept in blocks, the blocks may be sent individually or as a group.

Moreover, the following technology may be employed to save data migration time.

Index drop and/or rebuild technology: The computer device 200 may drop an index of a table in a target database and then transfer data and create an index after completion of the transfer. In this case, the data import speed may be improved. In some embodiments, the importation into the database may be performed not by the computer device 200 but by a system including the target database.

Meanwhile, a migration to a heterogeneous system may be considered. The data migration method allows for migrations even if the source system and the target system have different operating systems or DBMSs. For example, transmission is possible as long as the databases of the source system and target system have the same table structure. As explained previously with reference to FIG. 7, the computer device 200 exports the system architecture of the second database 720 and imports it into the third database 730, making their table structures identical. Accordingly, data migration to a cloud environment or between heterogeneous clouds is made possible.

Moreover, the computer device 200 may delete data from a source database (e.g., the first database 710 of FIG. 7). In this instance, the computer device 200 may use the extracted intended data to delete data in the source database that matches the extracted data. Data intended for migration may be deleted from the source database when there is a data deletion request from the buying company for security reasons. In general, such a deletion request may be made in the case of hostile M&A and/or if an organization to be separated is a company.

Hereinafter, the selection of a method for separating and building a system will be described in more detail. As explained previously, the method for separating and building a system may include a cleansing method and a migration method. The cleansing method is a method in which a system is built by copying a source system and then deleting data all data except data intended for separation, and the migration method is a method in which a system is built by selecting and migrating only data intended for separation from a source system. In the cleansing method, business continuity may be a primary concern. The cleansing method allows for online data cleansing and therefore has the benefit of minimizing downtime because data cleansing is possible after the start of a business. In contrast, in the migration method, data security may be a primary concern. For example, a data selling company may protect data assets from leaking out of their own network. Meanwhile, a combination of the cleansing method and the migration method may be used. For example, data security may be increased by using a system transfer method after cleansing. However, this may lead to increased business downtime.

It is necessary to clearly specify the time of handover from a selling company to a buying company which is a factor for determining the method for separating and building a system. For example, if there is a request for handover within 3 days after settlement of accounts by the selling company, it would be best to choose the migration method which offers high security as long as the handover can be done within 3 days from the date of the request, in consideration of data volume, system performance, network bandwidth, and the target system's built environment (cloud). If it is difficult to do the handover within 3 days using the migration method, the cleansing method may be employed to minimize downtime.

The following Table 4 shows a comparison of the cleansing method and the migration method.

TABLE 4

|  | CLEANSING | MIGRATION |
| --- | --- | --- |
| Overview | Copy entire data and then cleansedata not intended for migration | Selectively extract and transfer data intended for migration |
| Merits | Minimize system downtime Short project period and easy to stabilize the system | High data security Reduce storage costs Migration to heterogeneous systems |
| Demerits | Mixing of data during cleansing (critical data needs offlinecleansing) The storage size of the separation system should be equal to AS-IS size The separation system should have the same operating system as the source system. | Business downtime Requires export/import procedure for building initial target system |
| Things to consider | 1. Mixing of data not intended for migration (whether to permit copying of the system) 2. Offline cleansing of important security data during downtime (definition of priorities for cleansing) | 1. Maximum allowable downtime (Downtime and Invoice Management) |

If the volume of data to be migrated is 10% or less of the total volume of the source system, the migration method may be employed. In the migration method, however, if there is a chance that the date of acquisition requested by the buying company may be exceeded, other methods may be sought. In other methods, a temporary increase in server specifications for performance improvement, an increase in network bandwidth, data archiving, and building of a server dedicated for migration, as well as negotiations about the date of acquisition, may be considered. If the migration method is difficult to meet an intended date, the cleansing method may be used.

Figure 14:
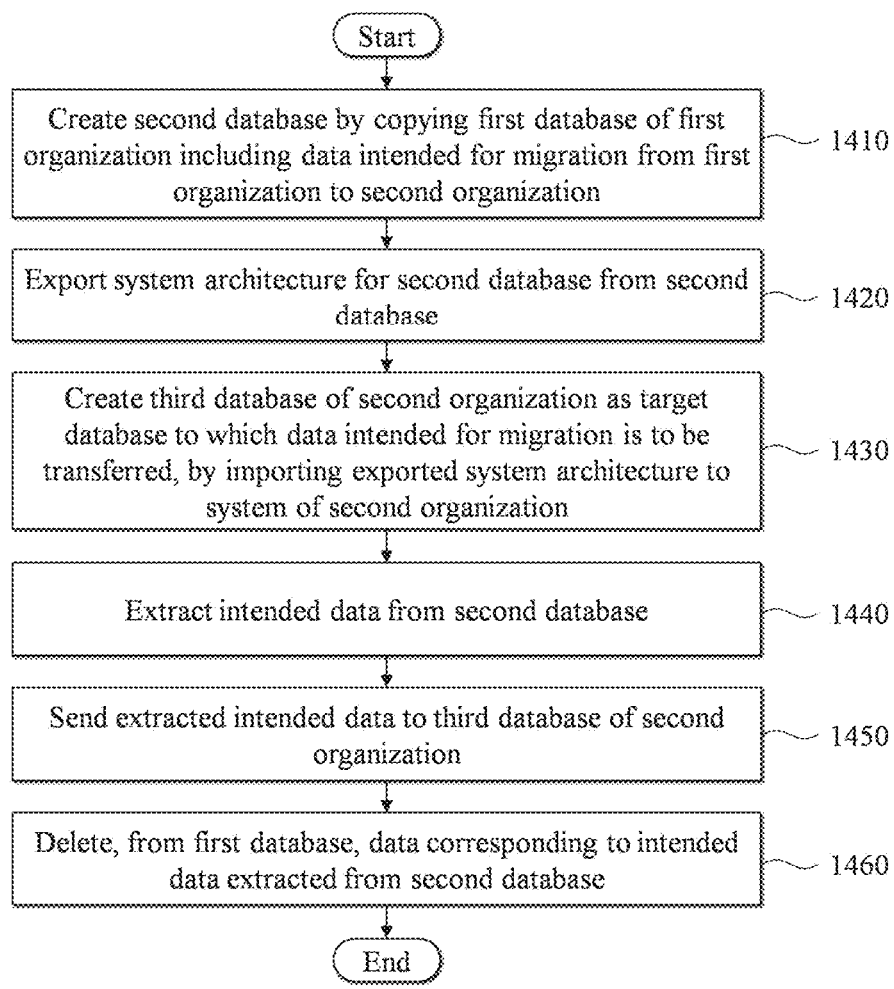
FIG. 14 is a flowchart illustrating an example of an organizational data transfer method according to one embodiment of the present disclosure.

FIG. 14 is a flowchart illustrating an example of an organizational data transfer method according to one embodiment of the present disclosure. The organizational data transfer method according to this embodiment may be performed by the computer device 200 which wants to transfer data intended for migration between a first organization and a second organization. In this instance, the processor 220 of the computer device 200 may be implemented to execute control instructions according to code of an operating system included in the memory 210 or according to code of at least one computer program. Here, the processor 220 may control the computer device 200 to perform the steps 1410 to 1460 included in the method of FIG. 14 according to control instructions provided by the code stored in the computer device 200.

In the step 1410, the computer device 200 may create a second database by copying a first database of the first organization including data intended for migration from the first organization to a second organization. In this instance, the first database may be located on a system of the first organization, and the second database may be located on the computer device 200. In this case, the computer device 200 may proceed with migration through the second database. Meanwhile, in some embodiments, the migration method may allow the intended data to be transferred directly from the first database to a third database of a target system (a system of the second organization), without copying the first database of the first organization. In this case, the step 1410 may be omitted, and the second database to be described later may correspond to the first database of the first organization.

In the step 1420, the computer device 200 may export a system architecture for the second database from the second database. Here, the system architecture may include at least one of a table structure, computer program, and procedure used in the system of the second database.

In the step 1430, the computer device 200 may create a third database of the second organization as a target database to which the intended data is to be transferred, by importing the exported system architecture to a system of the second organization. Because the system architecture is used to create the third database of the second organization, migrations may be made possible between heterogeneous systems which have different operating systems or DBMSs.

In the step 1440, the computer device 200 may extract the intended data from the second database. For example, the computer device 200 may determine migration requirements for the intended data at at least one of a company code level, a business area level, and a plant level by using a structure of the first organization and a structure of the second organization to be separated from the first organization. In this case, the computer device 200 may select data according to the migration requirements for the intended data by mapping objects corresponding to a particular company code of the company code level, a particular business area of the business area level, or a particular plant of the plant level. The selection of data and the extraction of selected data have been described above in detail.

In the step 1450, the computer device 200 may send the extracted intended data to the third database of the second organization. The intended data may be saved in a table or file, and the computer device 200 may send the data saved in the table individually or as a group or send the file to the third database. The sent intended data may be imported into the third database. In some embodiments, the intended data may be compressed and stored in a table or file and decompressed in a system including the third database, and then the decompressed data may be imported into the third database. Also, the data may be sent in parallel so as to be transferred quickly and imported into the third database.

In the step 1460, the computer device 200 may delete, from the first database, data corresponding to the intended data extracted from the second database. This step 1470 may be performed only upon receiving a deletion request issued for security reasons.

Figure 15:
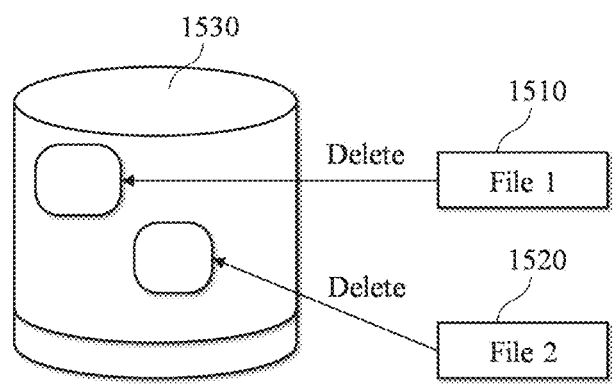
FIG. 15 is a diagram illustrating an example of a process for deleting data in one embodiment of the present disclosure.

FIG. 15 is a diagram illustrating an example of a process for deleting data in one embodiment of the present disclosure. For example, upon receiving a deletion request, the computer device 200 may check for data that has been transferred to the database of the second organization from the files 1510 and 1520 where the extracted intended data was stored. Afterwards, the computer device 200 may improve the security of the intended data by deleting the checked data from the database 1530 of the first organization.

Meanwhile, the steps 1410 to 1460 of FIG. 14 may be performed if the migration method is selected as the method for separating and building a system. For example, the computer device 200 may select either the cleansing method or the migration method as the method for separating and building a system, based on at least one of the downtime of the intended data, a required level of data security, storage costs, and whether a system for the database of the first organization and a system for the database of the second organization are identical in terms of operating system and database management system. Once the migration method is selected as the method for separating and building a system, the steps 1410 to 1460 of FIG. 14 may be performed. Meanwhile, the cleansing method may include a method in which a fourth database is created by cleansing data not intended for migration from the second database and the created fourth database is provided to the second organization. This cleaning method has been described above in detail.

As discussed above, according to the embodiments of the present disclosure, data may be transferred using a migration method. Moreover, in some embodiments, data may be transferred by selecting either a cleansing method or a migration method as a method for separating and building a system according to requirements.

The aforementioned system or device may be implemented in the form of a hardware component, a software component, and/or a combination of a hardware component and a software component. For example, the system and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processor may perform an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of them and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include program instructions, data files, and data structures solely or in combination. The medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software.

While the embodiments have been described and shown with reference to the limited embodiments and drawings as above, various corrections and modifications may be possible from the above description by one of ordinary skill in the art. For example, an appropriate result may be achieved even though the described technologies may be performed in a different order from the described methods, and/or components of the described systems, structures, devices, circuits, etc. are combined or coupled in a different form from the described methods, or are replaced or substituted by other components or equivalents.

Therefore, other implementations, other embodiments, and equivalents to the claims are also within the scope of the following claims.

What is claimed is:

1. A method for migrating organizational data by a computer device comprising at least one processor, the method comprising:
    selecting, by the at least one processor, a scheme for separating and building a system, the selected scheme being one of a cleansing scheme or a migration scheme,
        wherein the selection is based on target data to be migrated from a first organization to a second organization, including downtime of the target data, a required level of data security, storage costs, and whether a system for a first database of the first organization and a system for a third database of the second organization are identical in terms of operating system and database management system, and
        wherein the scheme for separating and building the system is:
            selected as the migration scheme in response to a determination that a volume of the target data is not more than 10% of a total volume of data of the first database,
            selected as the migration scheme in response to a determination that the required level of data security is a primary concern for selecting the scheme,
            selected as the migration scheme in response to a determination that the storage cost is to be reduced, and
            selected as the migration scheme in response to a determination that the operating system for the first database is different from the operating system for the third database;
    in response to selection of the migration scheme as the scheme for separating and building the system,
        exporting from the first database of the first organization, by the at least one processor, a system architecture of the first database including the target data, the exported system architecture including at least one of a table structure, a computer program, or a procedure used in a system of the first database without generating a second database by copying the first database;
        generating, by the at least one processor, the third database of the second organization, which is a target database to which the target data is to be transferred, in a system of the second organization by importing the exported system architecture to the system of the second organization;
        extracting, by the at least one processor, the target data from the first database, wherein the extracting of the target data comprises:
            determining migration requirements of the target data for each of a company code level, a business area level, and a plant level by using a structure of the first organization and a structure of the second organization to be separated from the first organization, and
            selecting data according to the migration requirements as the target data by mapping objects corresponding to a particular company code of the company code level, a particular business area of the business area level, and a particular plant of the plant level;
        sending, by the at least one processor, the extracted target data to the third database of the second organization;
    in response to selection of the cleansing scheme as the scheme for separating and building the system,
        generating, by the at least one processor, the second database by copying the first database;
        generating, by the at least one processor, a database for data transfer by cleansing from the second database data that is not to be migrated from the first organization to the second organization; and
        providing, by the at least one processor, the generated database for data transfer to the second organization.

2. The method of claim 1, further comprising deleting, by the at least one processor, data corresponding to the target data extracted from the first database from the first database.

3. A computer device comprising:
    at least one processor implemented to execute a computer-readable instruction, wherein the at least one processor is configured to select a scheme for separating and building a system, the selected scheme being one of a cleansing scheme or a migration scheme, wherein the selection is based on target data to be migrated from a first organization to a second organization, including downtime of the target data, a required level of data security, storage costs, and whether a system for a first database of the first organization and a system for a third database of the second organization are identical in terms of operating system and database management system, and wherein the scheme for separating and building the system is:
  selected as the migration scheme in response to a determination that a volume of the target data is not more than 10% of a total volume of data of the first database,
  selected as the migration scheme in response to a determination that the required level of data security is a primary concern for selecting the scheme,
  selected as the migration scheme in response to a determination that the storage cost is to be reduced, and
  selected as the migration scheme in response to a determination that the operating system for the first database and the operating system for the third database are different from each other,
in response to selection of the migration scheme as the scheme for separating and building the system, the at least one processor is further configured to,
  export from the first database of the first organization a system architecture of the first database including the target data, the exported system architecture including at least one of a table structure, a computer program, or a procedure used in a system of the first database without generating a second database by copying the first database,
  generate the third database of the second organization, which is a target database to which the target data is to be transferred, in a system of the second organization by importing the exported system architecture to the system of the second organization,
  extract the target data from the first database, and
    send the extracted target data to the second database of the second organization,
    wherein the at least one processor is configured to extract the target data by,
      determining migration requirements of the target data for each of a company code level, a business area level, and a plant level by using a structure of the first organization and a structure of the second organization to be separated from the first organization, and
    selecting data according to the migration requirements as the target data by mapping objects corresponding to a particular company code of the company code level, a particular business area of the business area level, and a particular plant of the plant level, and
in response to selection of the cleansing scheme as the scheme for separating and building the system, the at least one processor is further configured to, generate the second database by copying the first database;
  generate a database for data transfer by cleansing from the second database data that is not to be migrated from the first organization to the second organization; and
  provide the generated database for data transfer to the second organization.

\* \* \* \* \*